United States Patent
Khorashadi et al.

(10) Patent No.: US 8,472,980 B2
(45) Date of Patent: Jun. 25, 2013

(54) FLEXIBLE ARCHITECTURE FOR LOCATION BASED CROWDSOURCING OF CONTEXTUAL DATA

(75) Inventors: Behrooz Khorashadi, Mountain View, CA (US); Saumitra Mohan Das, San Jose, CA (US); Rajarshi Gupta, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 13 days.

(21) Appl. No.: 13/251,242

(22) Filed: Oct. 1, 2011

(65) Prior Publication Data

US 2013/0084891 A1    Apr. 4, 2013

(51) Int. Cl.
  *H04W 24/00*    (2009.01)
(52) U.S. Cl.
  USPC ............... 455/456.5; 455/256.3; 455/414.3; 455/518
(58) Field of Classification Search
  USPC ............... 455/456.3, 414.3, 41.2, 518–520; 709/203–206
  See application file for complete search history.

(56) References Cited

U.S. PATENT DOCUMENTS

| | | | |
|---|---|---|---|
| 8,213,970 B2* | 7/2012 | Beyer | 455/466 |
| 8,335,526 B2* | 12/2012 | Shankaranarayanan et al. | 455/456.5 |
| 2010/0048242 A1* | 2/2010 | Rhoads et al. | 455/556.1 |
| 2010/0205628 A1 | 8/2010 | Davis et al. | |
| 2010/0293026 A1* | 11/2010 | Vojnovic et al. | 705/8 |
| 2011/0082825 A1 | 4/2011 | Sathish et al. | |
| 2011/0143776 A1* | 6/2011 | Shankaranarayanan et al. | 455/456.3 |
| 2011/0173089 A1* | 7/2011 | Tan | 705/26.7 |
| 2012/0021762 A1* | 1/2012 | Garin et al. | 455/456.1 |
| 2012/0028649 A1* | 2/2012 | Gupta et al. | 455/456.1 |
| 2012/0028654 A1* | 2/2012 | Gupta et al. | 455/456.3 |
| 2012/0203651 A1* | 8/2012 | Leggatt | 705/26.3 |
| 2012/0265874 A1* | 10/2012 | Hoh et al. | 709/224 |
| 2013/0066968 A1* | 3/2013 | Ziegler | 709/204 |

OTHER PUBLICATIONS

F. Alt et al., "Location-based crowdsourcing: extending crowdsourcing to the real world", NordiCHI '10 Proceedings of the 6th Nordic Conference on Human-Computer Interaction: Extending Boundaries, pp. 13-22, Oct. 2010.

T. Yan et al., "Demo Abstract: mCrowd—A Platform for Mobile Crowdsourcing", 2007 IEEE Internatonal Conference on Mobile Adhoc and Sensor Systems, pp. 347-348, 2009.

(Continued)

*Primary Examiner* — Sharad Rampuria
(74) *Attorney, Agent, or Firm* — Silicon Valley Patent Group LLP (57) ABSTRACT

A system for the collection, aggregation and analysis of location based crowdsourcing data includes a server that server that controls the distribution of crowdsourcing requests and workloads to a plurality of external mobile platforms. The server receives crowdsourcing queries from multiple parties and provides measurement requests to the mobile platforms, e.g., based on the location of the mobile platforms. Upon receipt of the measured contextual data from the mobile platforms, the server may distribute information, such as the raw measured contextual data or an analysis of the measured contextual data, to the appropriate requesting parties in a secure manner. The mobile platform may receive a plurality of measurement requests from a remote server, wherein the plurality of measurement requests are based on crowdsourcing queries from a plurality of parties. The mobile platform may measure and provide to the remote server contextual data in response to the plurality of measurement requests.

38 Claims, 8 Drawing Sheets

OTHER PUBLICATIONS

Y. Liu et al., "A Crowdsourcing Based Mobile Image Translation and Knowledge Sharing Service", Proceedings of the 9th International Conference on Mobile and Ubiquitous Multimedia, pp. 6:1-6:9, 2010.

International Search Report and Written Opinion—PCT/US2011/054564—ISA/EPO—Mar. 28, 2012.

Lasnia et al., "Crowdsourcing Sensor Tasks to a Socio-Geographic Network" [Online] 13th AGILE International Conference on Geographic Information Science 2010. [retrieved on Mar. 8, 2012] Retrieved from the Internet <URL:http://agile2010.dsi.uminho.pt/pen/ShortPapers_PDF%5C98_DOC.pdf>.

* cited by examiner

```
TABLE blob_storage
    (
        recordID    INT UNSIGNED AUTO_INCREMENT,
        userID      smallint unsigned NOT NULL,
        consumer    smallint unsigned,
        lci         smallint unsigned,
        device      tinyint unsigned,
        os          tinyint unsigned,
        version     tinyint unsigned,
        arch        tinyint unsigned,
        time        TIMESTAMP DEFAULT CURRENT_TIMESTAMP,
        data        BLOB NOT NULL,
        Primary key(recordID)
    )
TABLE STPMap
    (
        stpID       MEDIUMINT UNSIGNED NOT NULL,
        recordID    INT UNSIGNED NOT NULL,
        FOREIGN KEY (recordID) REFERENCES blob_storage(recordID)
        ON DELETE CASCADE
    )
```

FLEXIBLE ARCHITECTURE FOR LOCATION BASED CROWDSOURCING OF CONTEXTUAL DATA

BACKGROUND

Location based crowdsourcing is important for a real time understanding of the physical environment. Real time indexing, analysis and dissemination of the physical world is possible due to the prevalence of mobile platforms with advanced computing and connectivity, such as cellular telephones, smart phones, tablets or other portable communication devises. Crowdsourcing using sensor data from mobile platforms is useful as it provides real samples from the physical environment, which may not be possible (or extremely difficult, costly and time consuming) to obtain using brute force survey techniques.

Current applications of location based crowdsourcing include, for example, gathering knowledge with respect to real time venue visitations or geographic WiFi signatures, or to understand a location based on conversations around the location. Additional applications of location based crowdsourcing are possible, but are generally not pursued to the difficulty associated with obtaining the necessary and specific crowdsourcing information.

SUMMARY

A system for the collection, aggregation and analysis of location based crowdsourcing data includes a server that controls the distribution of crowdsourcing requests and workloads to a plurality of external mobile platforms. The server receives crowdsourcing queries from multiple parties and provides measurement requests to the mobile platforms, e.g., based on the location of the mobile platforms. Upon receipt of the measured contextual data from the mobile platforms, the server may distribute information, such as the raw measured contextual data or an analysis of the measured contextual data, to the appropriate requesting parties in a secure manner. The mobile platform may receive a plurality of measurement requests from a remote server, wherein the plurality of measurement requests are based on crowdsourcing queries from a plurality of parties. The mobile platform may measure and provide to the remote server contextual data in response to the plurality of measurement requests.

In one implementation, a method includes receiving crowdsourcing queries from a plurality of parties; distributing a plurality of measurement requests to a plurality of mobile platforms based on the crowdsourcing queries; receiving measured contextual data from the plurality of mobile platforms in response to the plurality of measurement requests; and providing information to the plurality of parties based on the measured contextual data.

In another implementation, an apparatus includes an external interface capable of interfacing with a plurality of parties and a plurality of mobile platforms and a processor coupled to the external interface. The processor is adapted to receive a crowdsourcing queries from the plurality of parties via the external interface, distribute a plurality of measurement requests to the plurality of mobile platforms based on the crowdsourcing queries via the external interface, receive measured contextual data from the plurality of mobile platforms in response to the plurality of measurement requests via the external interface, and provide information to the plurality of parties based on the measured contextual data via the external interface.

In another implementation, an apparatus includes means for receiving crowdsourcing queries from a plurality of parties; means for distributing a plurality of measurement requests to a plurality of mobile platforms based on the crowdsourcing queries; means for receiving measured contextual data from the plurality of mobile platforms in response to the plurality of measurement requests; and means for providing information to the plurality of parties based on the measured contextual data.

In yet another implementation, a non-transitory computer-readable medium including program code stored thereon includes program code to cause a processor to receive crowdsourcing queries from a plurality of parties; program code to distribute a plurality of measurement requests to a plurality of mobile platforms based on the crowdsourcing queries; program code to cause a processor to receive measured contextual data from the plurality of mobile platforms in response to the plurality of measurement requests; and program code to provide information to the plurality of parties based on the measured contextual data.

In another embodiment, a method includes receiving a plurality of measurement requests from a remote server, wherein the plurality of measurement requests are based on crowdsourcing queries from a plurality of parties; measuring contextual data in response to the plurality of measurement requests; and providing the contextual data to the remote server.

In another embodiment, a mobile platform includes a wireless transceiver for wirelessly receiving and transmitting data to a remote server; and a processor coupled to the wireless transceiver, the processor being configured to cause the wireless transceiver to receive a plurality of measurement requests from a server, wherein the plurality of measurement requests are based on crowdsourcing queries from a plurality of parties, to measure contextual data in response to the plurality of measurement requests, and to cause the wireless transceiver to provide the contextual data to the remote server.

In another embodiment, an apparatus includes means for receiving a plurality of measurement requests from a remote server, wherein the plurality of measurement requests are based on crowdsourcing queries from a plurality of parties; means for measuring contextual data in response to the plurality of measurement requests; and means for providing the contextual data to the remote server.

In yet another embodiment, a non-transitory computer-readable medium including program code stored thereon includes program code to cause a wireless receiver to receive a plurality of measurement requests from a remote server, wherein the plurality of measurement requests are based on crowdsourcing queries from a plurality of parties; program code to measure contextual data in response to the plurality of measurement requests; and program code to cause a wireless transmitter to provide the contextual data to the remote server.

DETAILED DESCRIPTION

Figure 1:
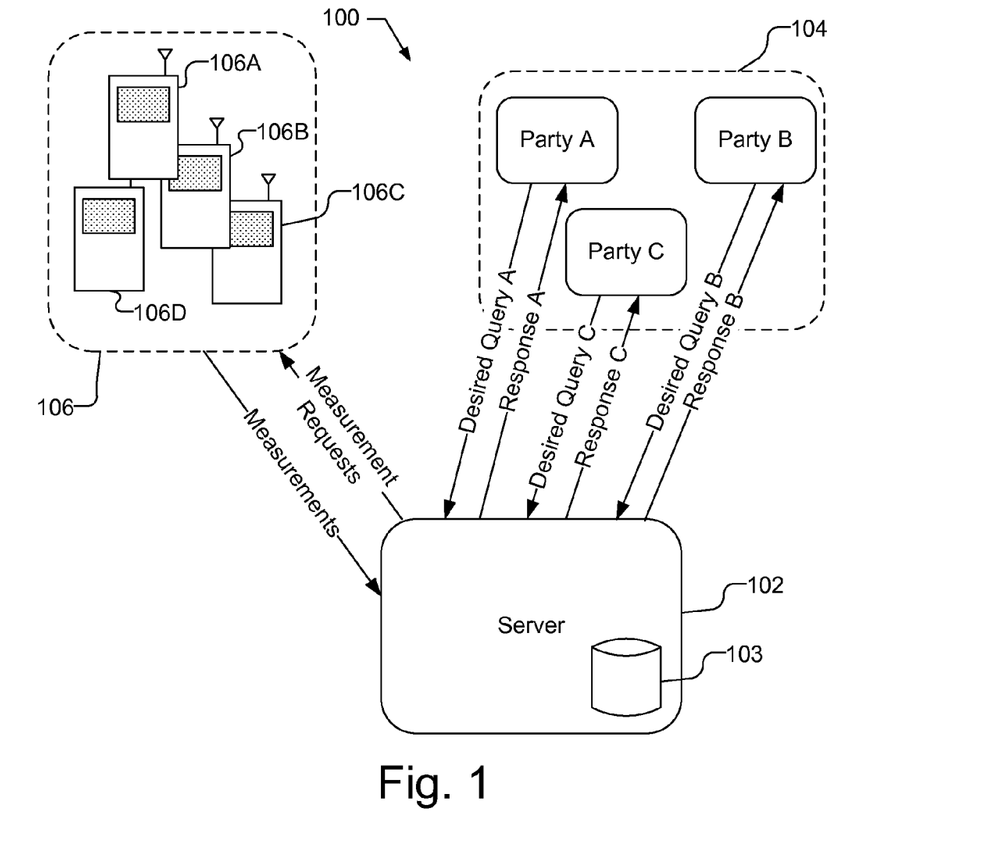
FIG. 1 illustrates a system for crowdsourcing, which includes a server that controls the distribution of crowdsourcing requests from multiple parties to multiple mobile platforms.

FIG. 1 illustrates a system 100 for crowdsourcing, which includes a server 102 that controls the distribution of crowdsourcing requests and workloads to mobile platforms 106. The server 102 may also provide a generic application programming interface (API) to several different parties 104, allowing each party to utilize the crowdsourcing capabilities of the mobile platforms 106 without the need for each individual party to deploy their own server and mobile platform applications. The crowdsourcing architecture of system 100 enables access to system level statistics from multiple mobile platforms 106, which are not available to application level crowdanalystics engines. The architecture of system 100 enables several useful aspects including what, when, where and how information is collected from mobile platforms, the collection, aggregation and analysis of data obtained from the mobile platforms, how the collection, aggregation and analysis of can be processed and may be used to enhance the experience of users of the mobile platforms, and the use of the collected information to provide added value for the parties 104. Thus, the system 100 provides efficient usage of mobile platform resources, a flexible API that accommodates multiple needs, minimizes the use of server resources for upload purposes, and secures crowdsourced data.

As illustrated in FIG. 1, multiple parties 104, identified as party A, party B, and party C (which are sometimes referred to herein as parties 104 or party 104) may individually communicate with a server 102 to provide individual desired queries, identified as Desired Query A, Desired Query B, and Desired Query C, respectively. Of course, there is no limitation on the number of entities that may be included in parties 104. The different parties may be third parties, e.g., external entities such as customers, as well as entity that controls and operates the server 102. Additionally, it should be understood that while a single server 102 is illustrated in FIG. 1 for simplicity, the server 102 may be a network of servers that collectively perform the function of server 102.

The desired queries provided by the parties 104 are generally related to contextual information for specific locations. Contextual information as used herein refers to the physical properties of the specific location, e.g., noise level, temperature, or any other information that may be measured using sensors on a mobile platform. Contextual information may also refer to description of the behavior of a user of a mobile platform while at the specific location, e.g., whether the user is standing, sitting, walking, talking, etc. Contextual information may also refers to a description of the mobile platform itself, and more particularly, how the mobile platform is being used, e.g., what specific applications are being run or what web sites are being visited.

The content of the desired queries, except for location, may be pre-generated and made available by server 102 based on the types of contextual data that can be measured by mobile platforms 106. For example, sensors on the mobile platform that may be used to measure contextual data for crowdsourcing include cameras, wireless transceivers (e.g., to measure WiFi Received Signal Strength Indication (RSSI) or Round Trip Time (RTT)), microphones, thermometers, motion and/or position sensors (e.g., accelerometers, gyroscopes, magnetometers, etc.), ambient light detectors, etc. . . . Thus, for example, desired queries may include a request for information related to the noise levels or temperatures at a specific location, such as a store, or across multiple locations, e.g., a chain of stores. More specifically, the request may be related to variations in noise level or temperature within locations, such as a mall. A query may be related to information with respect to WiFi access points at a location, such as new access points in a specific mall.

Contextual data related to the mobile platform may be obtained based on the type of application that is being run on the mobile platform, e.g., whether the mobile platform is being used as a cellular telephone, an SMS messenger, email client, internet access, etc., as well as specifics of the use, e.g., the internet sites being accessed, such as social network sites. Contextual data related to the behavior of the user may be obtained based on sensors, such as motion and/or position sensors, ambient light detectors, etc., as well as the type of application that is being run on the mobile platform. Thus, for example, queries may be related to the number or demographic of people at a specific location or that pass a specific location and at what times. Queries may also be related to contextual information about the behavior of people, such as the context in which people tend to use social networking.

The server 102 processes the desired queries from the parties 104 and generates specific measurement requests for contextual data, which are provided to the mobile platforms 106, labeled as mobile platforms 106A, 106B, 106C, and 106D. The measurement requests generated by the server 102 are provided to the mobile platforms 106 so that the resources of the mobile platforms are used efficiently. In other words, the same measurement requests may not be sent to every mobile platform simultaneously. Crowdsourcing is a location driven activity, and thus, the location of a particular mobile platform, as well as other relevant factors, may be used to determine if a measurement request is transmitted to (or accepted by) a particular mobile platform.

Figure 2:
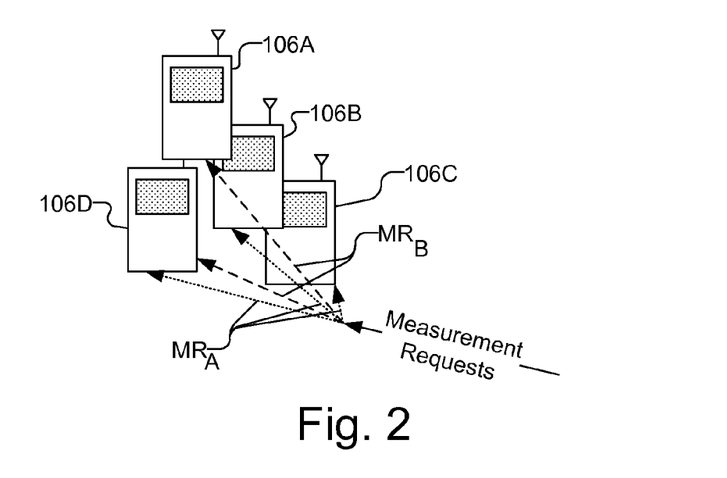
FIG. 2 illustrates multiple measurement requests being received by different mobile platforms.

FIG. 2 illustrates one measurement request $MR_A$ (illustrated by dotted lines) being received by mobile platforms 106B, 106C, and 106D, while another measurement request $MR_B$ (illustrated by dashed lines) being received by another group of mobile platforms 106A and 106D. For example, Party A in FIG. 1 may have provided a Desired Query A to server 102 to determine the noise level at all cafés in chain and Party B may have provided a Desired Query B to server 102 to determine the temperature at different positions within a mall. The server 102 generates a measurements request $MR_A$ for a noise sample in any store in the chain of cafés and a measurement request $MR_B$ for a temperature reading within the mall. Based on location information obtained, e.g., through satellite positioning systems (SPS) or other location measurement systems or techniques, server 102 provides measurement request $MR_A$ to mobile platforms 106B, 106C, and 106D, each of which are in one of the cafés in the target chain, and provides measurement request $MR_B$ to mobile platforms 106A and 106D, which are in the target mall. Mobile platform 106D receives both measurement request $MR_A$ and measurement request $MR_B$ as mobile platform 106D is in one of the target cafés, which is also in the target mall. Each of the mobile platforms 106 may accept or reject the measurement requests, e.g., based on the current mode of the mobile platform 106. For example, a mobile platform may accept a request for a noise sample if the mobile platform is in an appropriate listening mode, e.g., not on a telephone call.

As illustrated in FIG. 1, once the mobile platforms 106 collect the requested contextual data, the mobile platforms 106 return the contextual data to the server 102, which stores the data, e.g., in database 103. The mobile platforms 106 may provide the raw contextual data, or if desired, the mobile platforms 106 may appropriately process the contextual data, e.g., at the request of the server 102, or strip the data of any information that may be considered private, before sending the contextual data to the server 102. The server 102 may then analyze the measurements and provide the requested information to the appropriate parties 104, e.g., illustrated by Response A, Response B, and Response B. Alternatively, the server 102 may provide the raw data to the appropriate parties 104.

Figure 3:
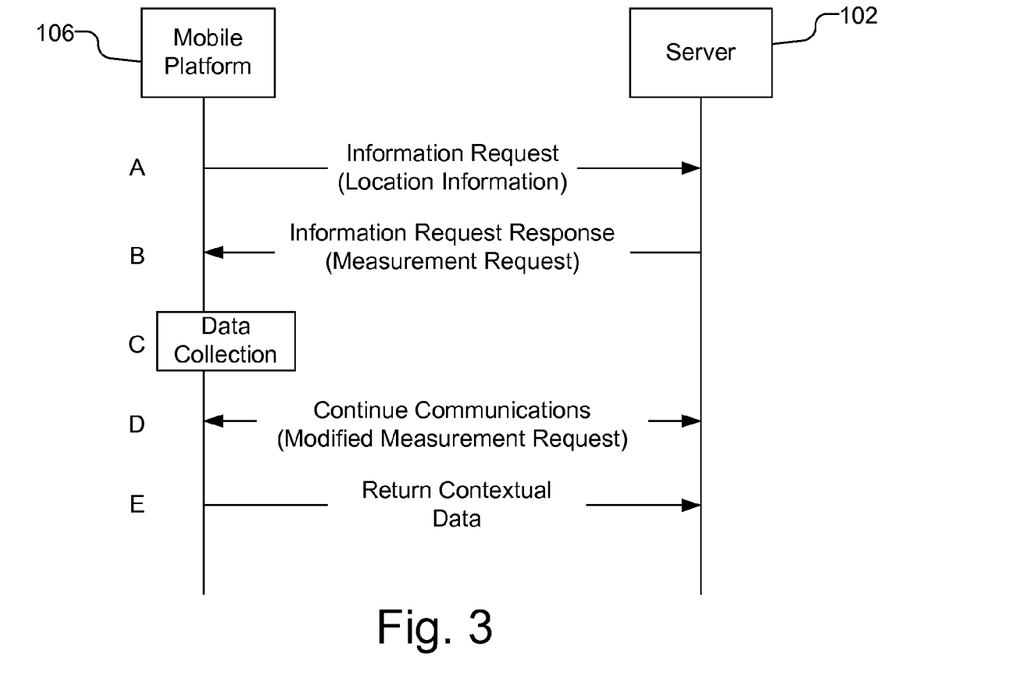
FIG. 3 illustrates the data collection mechanism between the server and a single mobile platform.

FIG. 3 illustrates the data collection mechanism between server 102 and a single mobile platform 106. At step A, the mobile platform 106 contacts the server 102 with an information request. The information request, may be, e.g., a request for map information such as navigation assistance data with which mobile platform 106 may derive a position fix, or a request for server 102 to provide a position fix of the mobile platform 106. If desired, the mobile platform 106 may also or alternatively request that the server 102 provide a measurement request for the current position of the mobile platform 106, e.g., after the mobile platform 106 and/or the server 102 determines the current position of the mobile platform 106. At step B, the server 102 provides an information request response with the desired information, e.g., the map information, which additionally includes a measurement request specific to the location of the mobile platform 106. In step C, the mobile platform 106 determines if the measurement request is acceptable, e.g., the measurement request is related to contextual data that mobile platform is capable of providing, and the mobile platform collects the requested contextual data. In step D, the mobile platform 106 and server 102 may continue to communicate, e.g., the server may query for modified (or different) measurement requests for additional or different information, which permits the mobile platform 106 to filter the collected data set in the case of changed needs of the server 102. In step E, the mobile platform 106 batches the collected contextual data and returns it to the server 102. The contextual data that is measured and provided to the server 102 by the mobile platforms 106 may be provided in data blobs annotated with Location Context Identifier (LCI) and consumer identification, which permits fast processing on the upload server side.

The location and time that contextual data from mobile platforms 106 is to be crowdsourced may be defined as a "space time polygon" (STP), which may be defined by the parties 104 or the server 102 in light of the desired queries of the parties 104. Data from one or more sensors from a mobile platform 106 may be requested at the same time. The STP may be used to define the frequency and number of sample parameters, thereby permitting the collection of sets of measurements using a single STP. An STP may be defined with a set of primitives, thereby allowing the definition of new STP compositions with variable grammar, as well as allowing for flexibility to accommodate sensors that may be made available in the future. For example, primitives such as "Camera.TakePicture", "Wifi.ScanRSSI", "Microphone.Listen", and "Thermometer.GetTemp" may be used. Each STP may include format information identified in Table 1.

TABLE 1

| | |
|---|---|
| STP ID | The unique ID that identifies an STP within the given LCI |
| Consumer ID | Uniquely identifies the consumer of the desired data. Can be used for securing data |
| Frequency | The frequency at which measurements are desired |
| Duration | The duration for which the measurements are desired |
| Polygon Definition | Defines the location and time boundaries of the STP |
| Grammar Definition | A compact representation describing how crowdsourced information is to be packaged. |
| Context Trigger | Defines a single or set of primitives that defines when to initiate an STP check. For example, collect information only when a user is moving |

Each LCI may contain multiple STP objects, which are bundled and sent as an STP group for a given LCI to the requesting mobile platform 106.

Once the contextual data is collected by the mobile platform 106, the mobile platform 106 may make another request to the server 102 to update the STP sets (step D in FIG. 3). The mobile platform then packages the collected contextual data into return data objects 150, illustrated in FIG. 4, which may contain the information identified in Table 2.

TABLE 2

| | |
|---|---|
| LCI ID | The LCI that the return data is in reference to |
| STP set | The STPs that are being satisfied by the attached blob |
| Blob | An encrypted data set that contains crowdsourced information about each STP referenced in the STP set |

Figure 4:
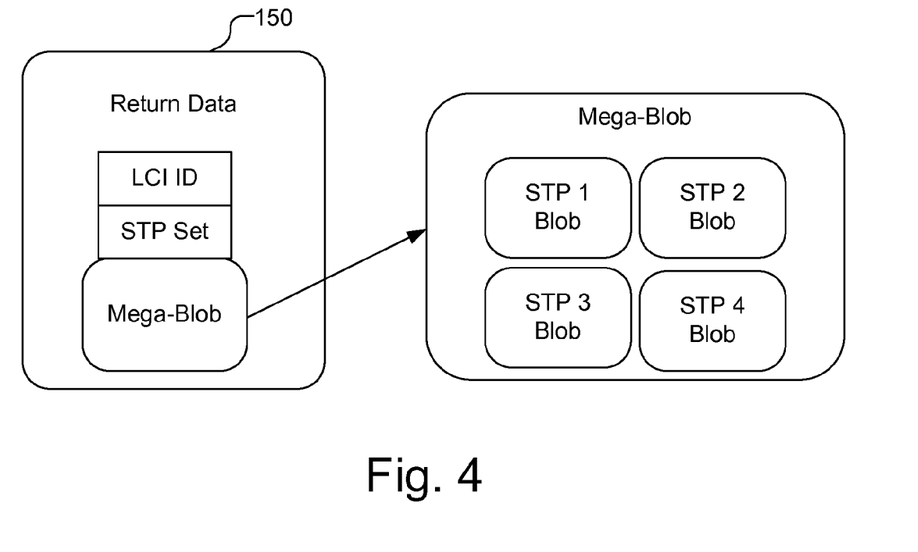
FIG. 4 illustrates packaged contextual data collected by a mobile platform and provided to the server as a return data object.

As illustrated in FIG. 4, the blob in the return data may be a mega-blob, which includes blobs for multiple STPs. The server 102 upon receipt of the return data may unpack the data blobs and process the STP data to perform analytics, or alternatively, pass the data blobs to the appropriate requesting party 104.

Figure 5:
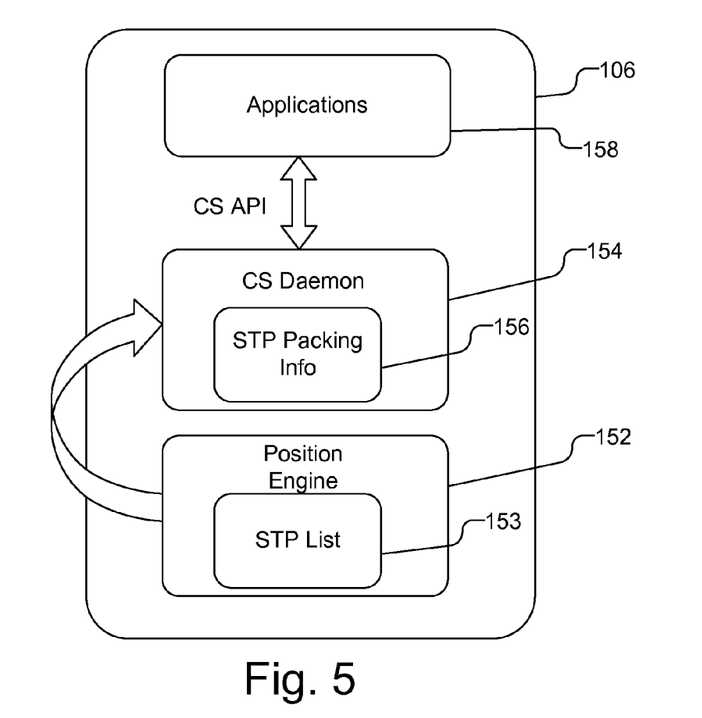
FIG. 5 illustrates a possible architecture for a mobile platform capable of providing measured contextual data in response to a measurement request from the server.

FIG. 5 illustrates architecture for a mobile platform 106. The mobile platform 106 includes modules that are used for the location based crowdsourcing of contextual data. The mobile platform includes a position engine 152 and an STP list 153 that is available to the position engine 152, e.g., either within the position engine 152 as illustrated in FIG. 5, or otherwise accessible to the position engine. The position engine 152 determines the position of the mobile platform 106 in any desired manner, and uses the STP list 153 to determine when, how and what contextual data to collect. The position engine 152 may contain STP IDs and polygons in an indoor LCI or in a given range from SPS locations in an outdoor LCI. The position engine 152 may calculate STP hits with every fix or on any other desired schedule which may optimize work load. For example, a queue of STPs to be satisfied may be maintained, including the frequency and number of samples counter associated with each STP object. STPs with a frequency greater than 0 are scheduled as multiple positioning events in the queue with a time of execution, similar to a discrete event simulator. If there are no STPs with a defined frequency, then only user initiated position fixes may be used to calculate STP hits. If desired, position fixes may be randomly scheduled in an attempt to satisfy STPs. Based on the average distance of the STPs from the random position fix events, the random position fix events may be decreased or discontinued if they are far from the STPs.

Once the contextual data is collected, the information is passed to the crowdsource (CS) Daemon 154, which can bundle the collected information into blobs. The position engine 152 may asynchronously inform the CS Daemon 154 of STP ID hits. The CS Daemon 154 includes STP Packing information 156, which enables the CS Daemon 154 to correctly write the collected contextual data into a format that will be understood by the server 102 or the party 104 that requested the data, e.g., based on the STP grammar definition. In addition, the CS Daemon 154 may package the data into blobs and encrypt the data using a generated symmetric key. All information regarding STP packaging, STP consumer encryption mechanism etc., may be contained in the CS Daemon 154. In addition the CS Daemon 154 provides a CS API to applications 158 on the mobile platform 106 that would like to use available information. These applications 158, however, must provide the necessary credentials to consume crowdsourced data, e.g., public-private key verification for corresponding STP data.

Figure 6:
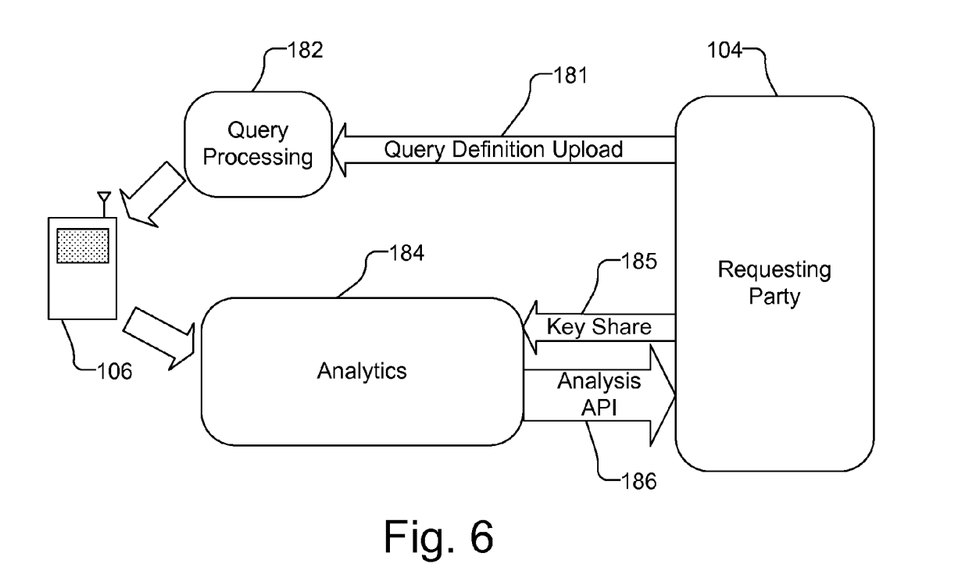
FIG. 6 illustrates one possible process in which the server receives the return data from the mobile platforms and provides analytic services for the requesting party 104.

FIG. 6 illustrates one possible process in which the server 102 receives the return data from the mobile platforms 106 and provides analytic services to the requesting party 104. As illustrated in FIG. 6, the requesting party 104 defines queries for desired locations and uploads them to the server 102 (181). For example, the party 104 may define STPs for LCIs and upload them to the server 102. The queries are processed by query processing unit 182 in the server 102 and measurement requests for contextual data are provided to the mobile platform 106, as discussed above. When the return data is collected by the server 102, and the requesting party 104 shares the public-private key and grammar with the server 102 (185), the analytics unit 184 of the server 102 can decrypt and unpack the return data that pertains to the requesting party 104. The server provides an analysis API 186 to the requesting party 104, which allows the requesting party 104 to perform queries on the collected information.

Figure 7:
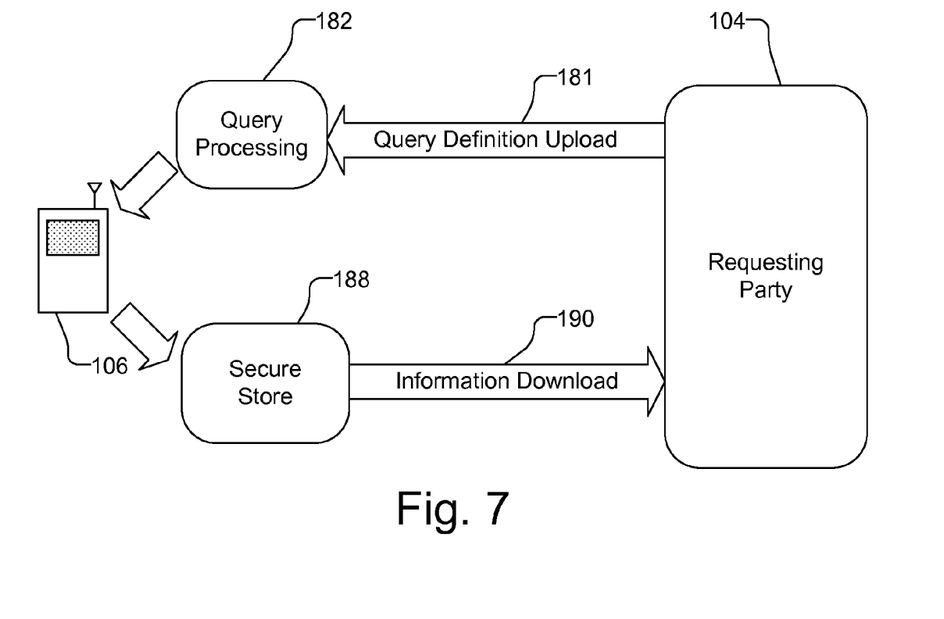
FIG. 7 illustrates another possible process in which the server provides the raw data to the requesting party.

FIG. 7 illustrates another possible process in which the server 102 provides the raw data to the requesting party 104. Thus, as illustrated in FIG. 7, the requesting party 104 perform their own data analytics. The server 102 receives the return data from the mobile platform 106 and acts as a secure store 188, by storing the raw data in database 103 shown in FIG. 3, from which the requesting party 104 can obtain and information download 190 with the crowdsource data for its use.

Figure 8:
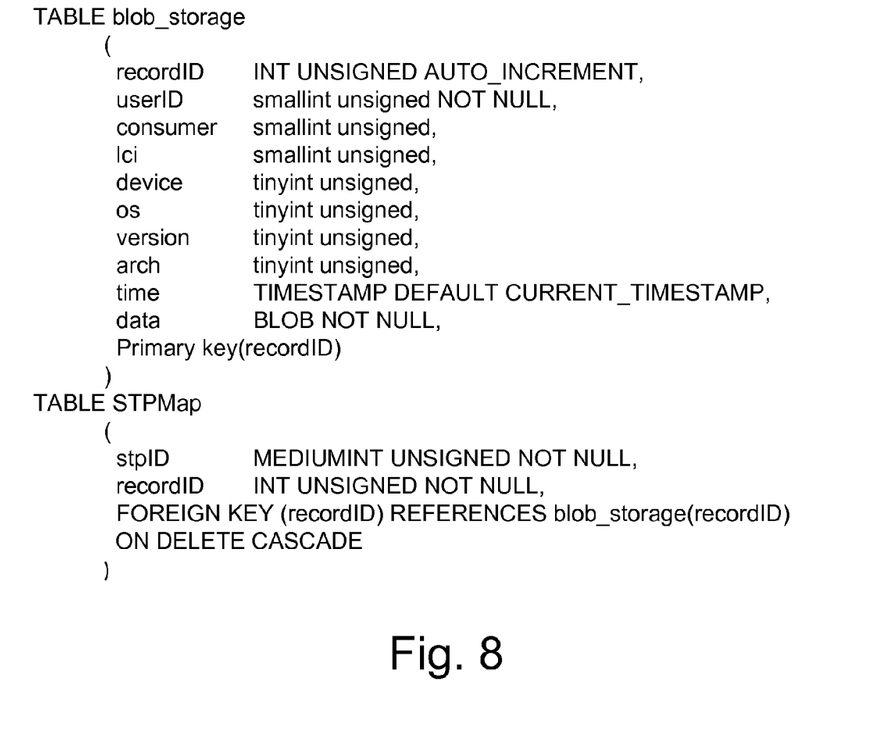
FIG. 8 illustrates an example of the basic table building blocks for the database of measured contextual data which allows for an efficient but generic data upload mechanism.

The server 102 may store the return data from all the mobile platforms 106 in a database 103, as illustrated in FIG. 1. FIG. 8 illustrates an example of the basic table building blocks for the database 103 which allows for an efficient but generic data upload mechanism. The STPMap allows for a fast search of all records in the database 103 pertaining to a particular STP without requiring packing and reading the blob data. User ID in the blob storage table allows for the requesting party 104 to quickly query all information pertaining to itself if desired.

Figure 9:
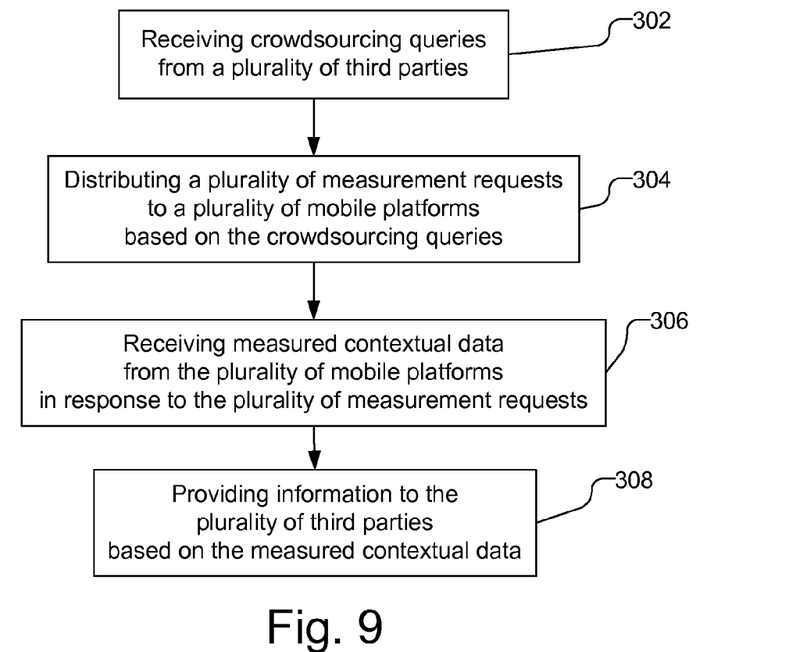
FIG. 9 illustrates a flow chart of a method of allowing several parties to utilize crowdsourcing without the need for each party to deploy its own applications and server.

FIG. 9 illustrates a flow chart of a method of allowing several parties to utilize crowdsourcing without the need for each party to deploy its own applications and server. As illustrated, crowdsourcing queries are received from a plurality of parties (302). The crowdsourcing queries may be formatted to provide the desired location and time of the measurements, as well as the type of contextual data to be measured. If desired, the crowdsourcing queries maybe formatted as STPs as discussed above or in any other format desired, including the measurement requests to be submitted to the mobile platforms. A plurality of measurement requests is distributed to a plurality of mobile platforms based on the crowdsourcing queries (304). The measurement requests may be submitted to only a subset of the mobile platforms that are available for crowdsourcing for a specific crowdsourcing query, such as only mobile platforms that are known to be physically located at a specific target location. The measurement requests may also be submitted to mobile platforms whose position is unknown or indeterminate, and the mobile platforms may determine whether to process specific measurement requests. If the crowdsourcing queries from 302 include the measurement requests, i.e., the contextual data to be measured, the measurement requests may simply be passed on to the appropriate mobile platforms. Alternatively, the measurement requests may be generated, e.g., by server 102, based on the received crowdsourcing queries. The measured contextual data is received from the plurality of mobile platforms in response to the plurality of measurement requests (306). Information, such as the raw data or meaningful processed data, is then provided to the plurality of third parties based on the received measured contextual data (308).

Figure 10:
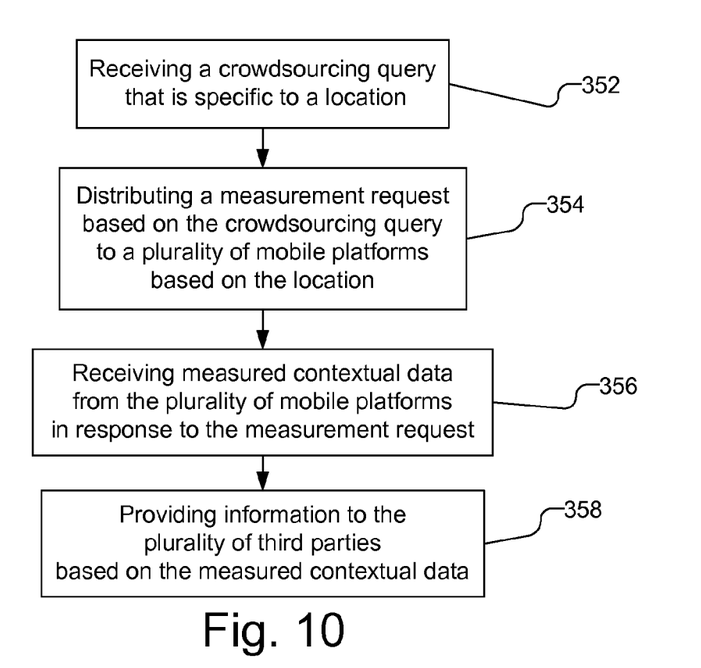
FIG. 10 illustrates a flow chart of a method of distributing crowdsourcing requests and workloads to mobile platforms based on a crowdsourcing query.

FIG. 10 illustrates a flow chart of a method of distributing crowdsourcing requests and workloads to mobile platforms based on a crowdsourcing query. As illustrated, a crowdsourcing query that is specific to a location is received (352). By way of example, the crowdsourcing query may be from a third party or may be an internally generated query. A measurement request based on the crowdsourcing query is distributed to a plurality of mobile platforms based on the location (354). In other words, mobile platforms that are not within the location do not receive or do not accept the measurement requests. Additionally, time may be a parameter for the distribution of the measurement request, i.e., mobile platforms that are not at the desired location at a specified time period do not receive or do not accept the measurement requests. The measurement request may include, e.g., the frequency and the number of samples of the contextual data to be collected. The mobile platforms perform the desired measurements and the measured contextual data from the plurality of mobile platforms is received in response to the measurement request (356). Information, such as the raw data or meaningful processed information is then provided to the party that requested the crowdsourcing query based on the received measured contextual data (358).

Figure 11:
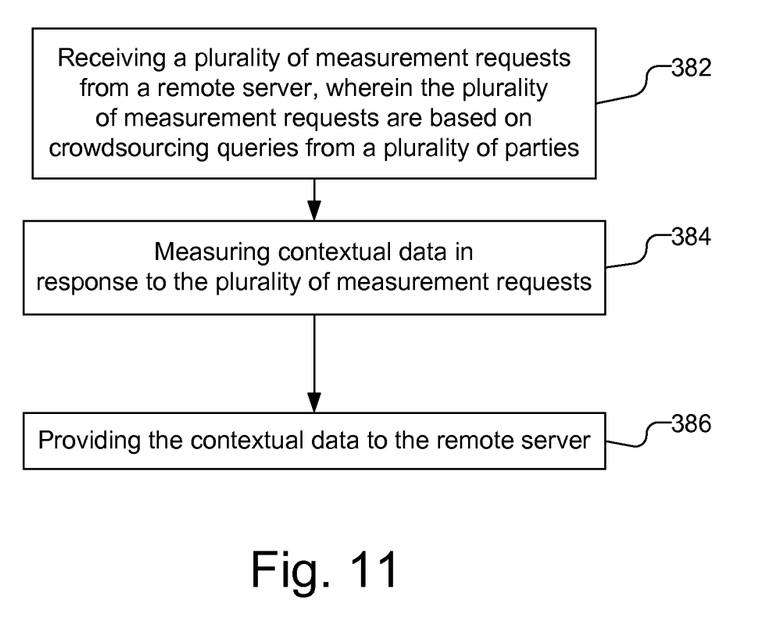
FIG. 11 illustrates a flow chart of a method of measuring contextual data based on receipt of a plurality of measurement requests.

FIG. 11 illustrates a flow chart of a method of measuring contextual data based on receipt of a plurality of measurement requests. A plurality of measurement requests are received by a mobile platform from a remote server (382). The plurality of measurement requests are based on crowdsourcing queries from a plurality of parties. The mobile platform measures contextual data in response to the plurality of measurement requests (384) and provides the contextual data to the remote server (386). The contextual data may include, e.g., sensor data, data related to a physical description of behavior of a user of the mobile platform, and data related to use of the mobile platform. Additionally, at least one of the plurality of measurement requests is specific to a location and may include a frequency and a number of samples to be measured.

Figure 12:
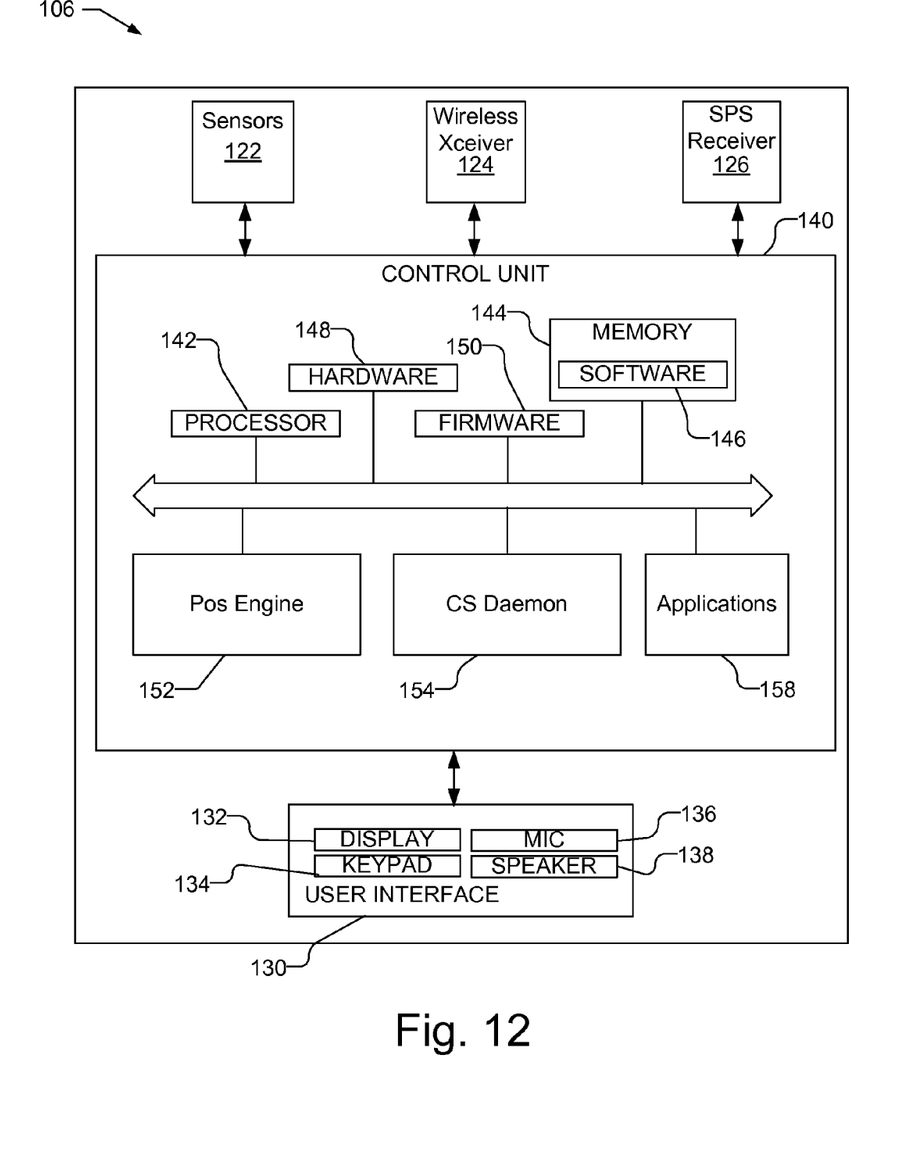
FIG. 12 illustrates a block diagram of a mobile platform capable of measuring contextual data upon receipt of a measurement request.

FIG. 12 illustrates a block diagram of a mobile platform 106 capable of measuring contextual data upon receipt of a measurement request, e.g., from server 102. The mobile platform 106 includes a number of sensors 122, which may include, e.g., a camera, inertial sensors (e.g., quartz sensors, gyros, or micro-electromechanical system (MEMS) sensors used as linear accelerometers), microphone (shown separately as microphone 136), temperature sensor, ambient light sensors, wireless transceivers (shown separate as wireless transceiver 124), e.g., to measure WiFi RSSI or RTT), and any other desired sensor.

The mobile platform 106 includes a wireless transceiver 124, which is used to access the server 102 via a wireless network, as well as, e.g., measure RSSI or RTT. The wireless transceiver 124 is capable of connecting to server 102 from which measurement requests are obtained, e.g., through access points for WiFi or Femtocells, and may be a wireless wide area network (WWAN), a wireless local area network (WLAN), a wireless personal area network (WPAN), and so on, or through cellular telephonic access points. The wireless transceiver 124 (or an additional wireless transceiver) may be capable of communicating to the wireless network using cellular towers or via satellite vehicles. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Mobile platform 106 may include additional positioning components, such as a SPS receiver 126, which receives signals from a SPS system, such as the Global Positioning System (GPS), Galileo, Glonass or Compass, as well as various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. Mobile platform 106 may also determine its position using wireless transceiver 124 and trilateration of cellular towers, or RSSI of access points. Other sensors may also be used to determine position, such as accelerometers, gyroscopes, etc., or a camera using vision based positioning techniques.

The mobile platform 106 may also include a user interface 130 that includes a display 132 capable of displaying images captured by a camera. The user interface 130 may also include a keypad 134 or other input device through which the user can input information into the mobile platform 106. If desired, the keypad 134 may be obviated by integrating a virtual keypad into the display 132 with a touch sensor. The user interface 130 may also include the microphone 136 and speaker 138, e.g., if the mobile platform is a cellular telephone. Of course, mobile platform 106 may include other elements unrelated to the present disclosure.

The mobile platform 106 also includes a control unit 140 that is connected to and communicates with the sensors 122, wireless transceiver 124, and SPS receiver 126, as well as the user interface 130, along with any other desired features. The control unit 140 may be provided by a processor 142 and associated memory/storage 144, which may include software 146, as well as hardware 148, and firmware 150. The control unit 140 includes position engine 152 as well as CS Daemon 154 and applications 158, as discussed above. The position engine 152, CS Daemon 154 and applications 158, are illustrated separately and separate from processor 142 for clarity, but may be a combined and/or implemented in the processor 142 based on instructions in the software 146 which is run in the processor 142.

It will be understood as used herein that the processor 142, as well as one or more of the position engine 152, CS Daemon 154 and applications 158 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 148, firmware 180, software 146, or any combination thereof. For a hardware implementation, position engine 152, CS Daemon 154 and applications 158 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 144 and executed by the processor 142. Memory may be implemented within or external to the processor 142.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 13:
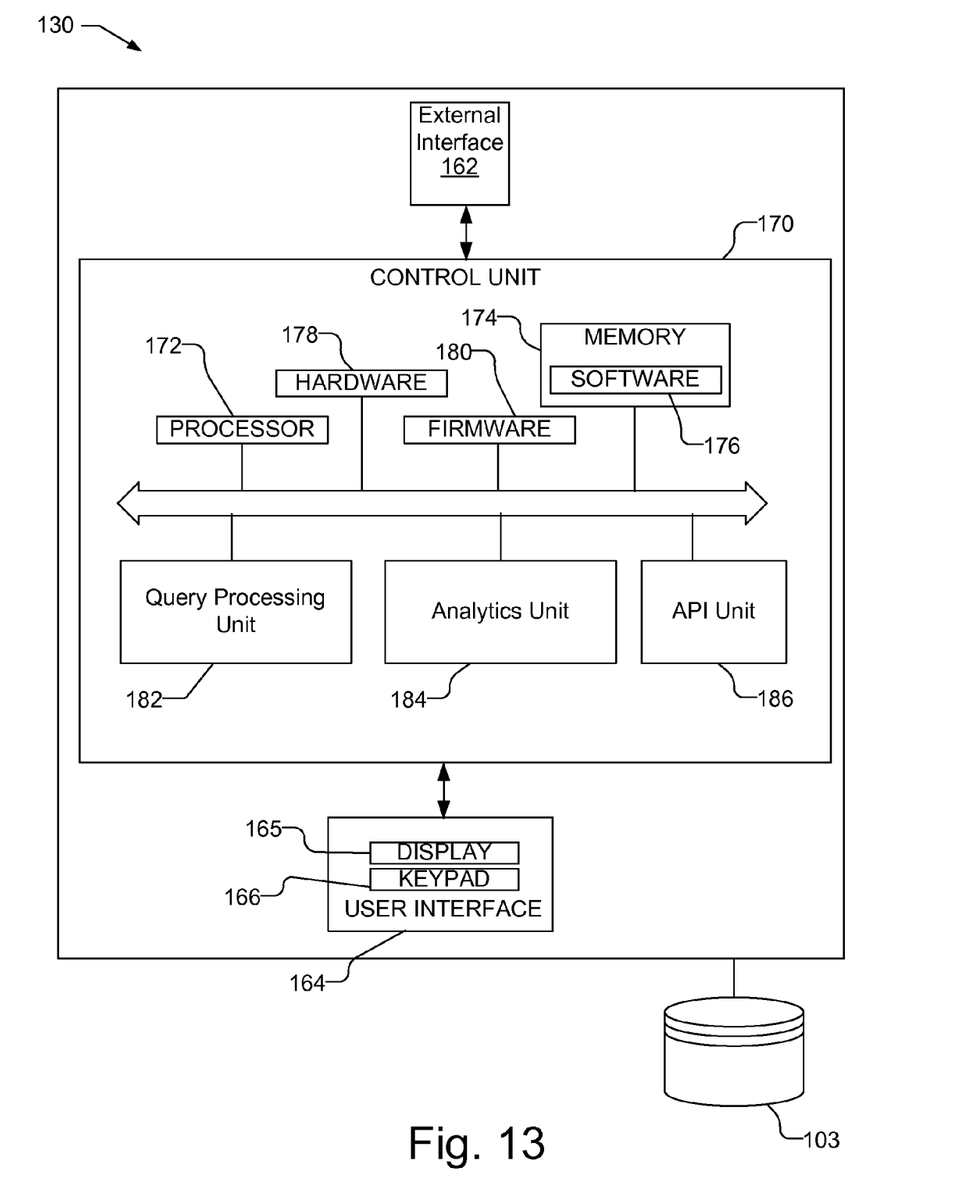
FIG. 13 illustrates a block diagram of a server capable of receiving crowdsourcing queries from parties and preparing and sending measurement requests in response to a plurality of mobile platforms, as well as receiving the measured contextual data from the mobile platforms and providing the information to the requesting parties.

FIG. 13 illustrates a block diagram of a server 102 capable of receiving crowdsourcing queries from parties 104 and preparing and sending measurement requests in response to a plurality of mobile platforms 106, as well as receiving the measured contextual data from the mobile platforms 106 and providing the information to the requesting parties 104, as discussed above. While FIG. 13 illustrates a single server 102, it should be understood that multiple servers may be used. The server 102 includes an external interface 162, which is used to communicate with the parties 104 as well as the plurality of mobile platforms 106 (FIG. 1). The external interface 162 may be a wired communication interface, e.g., for sending and receiving signals via Ethernet or any other wired format. Alternatively, if desired, the external interface 162 may be a wireless interface. The server 102 further includes a user interface 164 that includes, e.g., a display 165 and a keypad 166 or other input device. As illustrated, the server 102 is coupled to the database 103 for storing the measured contextual data from the mobile platforms 106.

The server 102 includes a server control unit 170 that is connected to and communicates with the external interface 162 and the user interface 164. The server control unit 170 accepts and processes data from the external interface 162 and the user interface 164 and controls the operation of those devices. The server control unit 170 may be provided by a processor 172 and associated memory/storage 174, which may include software 176, as well as hardware 178, and firmware 180. The server control unit 170 includes a query processing unit 182 that processes queries received from parties 104 and produces measurement requests to be provided to mobile platforms 106 via the external interface 162. The server control unit 170 further includes an analytics unit 184 to process measured contextual data received from the mobile platforms and includes an API unit 186 to provide the parties 104 with access to the information, e.g., in the form of raw measured contextual data or processed data. The query processing unit 182, analytics unit 184, and API unit 186 are illustrated separately and separate from processor 172 for clarity, but may be a combined and/or implemented in the processor 172 based on instructions in the software 176 which is run in the processor 172.

It will be understood as used herein that the processor 172, as well as the query processing unit 182, analytics unit 184, and API unit 186 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 178, firmware 180, software 176, or any combination thereof. For a hardware implementation, the query processing unit 182, analytics unit 184, and API unit 186 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 174 and executed by the processor 172. Memory may be implemented within or external to the processor 172.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    receiving crowdsourcing queries from a plurality of parties;
    distributing a plurality of measurement requests bundled together to a plurality of mobile platforms based on the crowdsourcing queries from the plurality of parties;
    receiving measured contextual data from the plurality of mobile platforms in response to the plurality of measurement requests, wherein measured contextual data comprises at least one of sensor data, data related to a physical description of behavior of a user of a mobile platform, and data related to use of the mobile platform; and
    providing information to the plurality of parties based on the measured contextual data.

2. The method of claim 1, wherein at least one of the crowdsourcing queries is specific to a location, and one of the plurality of measurement requests is distributed to a second plurality of mobile platforms at the location.

3. The method of claim 2, wherein the one of the plurality of measurement requests includes a frequency and a number of samples to be measured.

4. The method of claim 1, wherein the information provided to the plurality of parties is the measured contextual data.

5. The method of claim 1, further comprising analyzing the measured contextual data to derive processed information, wherein the information provided to the plurality of parties is the processed information.

6. The method of claim 1, further comprising producing the plurality of measurement requests based on the crowdsourcing queries.

7. The method of claim 1, further comprising receiving an encryption key before providing the information to each party.

8. An apparatus comprising:
an external interface capable of interfacing with a plurality of parties and a plurality of mobile platforms;
a processor coupled to the external interface, the processor is adapted to receive crowdsourcing queries from the plurality of parties via the external interface, distribute a plurality of measurement requests bundled together to the plurality of mobile platforms based on the crowdsourcing queries from the plurality of parties via the external interface, receive measured contextual data from the plurality of mobile platforms in response to the plurality of measurement requests via the external interface, wherein measured contextual data comprises at least one of sensor data, data related to a physical description of behavior of a user of a mobile platform, and data related to use of the mobile platform, and provide information to the plurality of parties based on the measured contextual data via the external interface.

9. The apparatus of claim 8, wherein at least one of the crowdsourcing queries is specific to a location, and one of the plurality of measurement requests is distributed to a second plurality of mobile platforms at the location.

10. The apparatus of claim 9, wherein the one of the plurality of measurement requests includes a frequency and a number of samples to be measured.

11. The apparatus of claim 8, wherein the information provided to the plurality of parties is the measured contextual data.

12. The apparatus of claim 8, wherein the processor is further adapted to analyze the measured contextual data to derive processed information, wherein the information provided to the plurality of parties is the processed information.

13. The apparatus of claim 8, wherein the processor is further adapted to produce the plurality of measurement requests based on the crowdsourcing queries.

14. The apparatus of claim 8, wherein the processor is further adapted to receive an encryption key before providing the information to each party.

15. An apparatus comprising:
means for receiving crowdsourcing queries from a plurality of parties;
means for distributing a plurality of measurement requests bundled together to a plurality of mobile platforms based on the crowdsourcing queries from the plurality of parties;
means for receiving measured contextual data from the plurality of mobile platforms in response to the plurality of measurement requests, wherein measured contextual data comprises at least one of sensor data, data related to a physical description of behavior of a user of a mobile platform, and data related to use of the mobile platform; and
means for providing information to the plurality of parties based on the measured contextual data.

16. The apparatus of claim 15, wherein at least one of the crowdsourcing queries is specific to a location, and one of the plurality of measurement requests is distributed to a second plurality of mobile platforms at the location.

17. The apparatus of claim 16, wherein the one of the plurality of measurement requests includes a frequency and a number of samples to be measured.

18. The apparatus of claim 15, wherein the information provided to the plurality of parties is the measured contextual data.

19. The apparatus of claim 15, further comprising means for analyzing the measured contextual data to derive processed information, wherein the information provided to the plurality of parties is the processed information.

20. The apparatus of claim 15, further comprising means for producing the plurality of measurement requests based on the crowdsourcing queries.

21. The apparatus of claim 15, further comprising means for receiving an encryption key before providing the information to each party.

22. A non-transitory computer-readable medium including program code stored thereon, comprising:
program code to cause a processor to receive crowdsourcing queries from a plurality of parties;
program code to distribute a plurality of measurement requests bundled together to a plurality of mobile platforms based on the crowdsourcing queries from the plurality of parties;
program code to cause the processor to receive measured contextual data from the plurality of mobile platforms in response to the plurality of measurement requests, wherein measured contextual data comprises at least one of sensor data, data related to a physical description of behavior of a user of a mobile platform, and data related to use of the mobile platform; and
program code to provide information to the plurality of parties based on the measured contextual data.

23. The non-transitory computer-readable medium of claim 22, wherein at least one of the crowdsourcing queries is specific to a location, and one of the plurality of measurement requests is distributed to a second plurality of mobile platforms at the location.

24. The non-transitory computer-readable medium of claim 23, wherein the one of the plurality of measurement requests includes a frequency and a number of samples to be measured.

25. The non-transitory computer-readable medium of claim 22, wherein the information provided to the plurality of parties is the measured contextual data.

26. The non-transitory computer-readable medium of claim 22, further comprising program code to analyze the measured contextual data to derive processed information, wherein the information provided to the plurality of parties is the processed information.

27. The non-transitory computer-readable medium of claim 22, further comprising program code to produce the plurality of measurement requests based on the crowdsourcing queries.

28. The non-transitory computer-readable medium of claim 22, further comprising program code to cause the processor to receive an encryption key before providing the information to each party.

29. A method comprising:
- receiving a plurality of measurement requests bundled together from a remote server, wherein the plurality of measurement requests are based on crowdsourcing queries from a plurality of parties;
- measuring contextual data in response to the plurality of measurement requests; and
- providing the contextual data to the remote server, wherein the contextual data comprises at least one of sensor data, data related to a physical description of behavior of a user of a mobile platform that receives the plurality of measurement requests, and data related to use of the mobile platform.

30. The method of claim 29, wherein at least one of the plurality of measurement requests is specific to a location.

31. The method of claim 30, wherein the at least one of the plurality of measurement requests includes a frequency and a number of samples to be measured.

32. A mobile platform comprising:
- a wireless transceiver for wirelessly receiving and transmitting data to a remote server; and
- a processor coupled to the wireless transceiver, the processor being configured to cause the wireless transceiver to receive a plurality of measurement requests bundled together from a server, wherein the plurality of measurement requests are based on crowdsourcing queries from a plurality of parties, to measure contextual data in response to the plurality of measurement requests, and to cause the wireless transceiver to provide the contextual data to the remote server, the mobile platform further comprising sensors, wherein the contextual data comprises at least one of sensor data from the sensors, data related to a physical description of behavior of a user of the mobile platform, and data related to use of the mobile platform.

33. The mobile platform of claim 32, the mobile platform further comprising a position sensor, wherein the processor is further configured to determine a location of the mobile platform based on measurements from the position sensor, wherein at least one of the plurality of measurement requests is specific to the location.

34. The mobile platform of claim 33, wherein the at least one of the plurality of measurement requests includes a frequency and a number of samples to be measured.

35. An apparatus comprising:
- means for receiving a plurality of measurement requests bundled together from a remote server, wherein the plurality of measurement requests are based on crowdsourcing queries from a plurality of parties;
- means for measuring contextual data in response to the plurality of measurement requests; and
- means for providing the contextual data to the remote server, wherein the contextual data comprises at least one of sensor data, data related to a physical description of behavior of a user of a mobile platform that receives the plurality of measurement requests, and data related to use of the mobile platform.

36. The apparatus of claim 35, wherein at least one of the plurality of measurement requests is specific to a location and includes a frequency and a number of samples to be measured.

37. A non-transitory computer-readable medium including program code stored thereon, comprising:
- program code to cause a wireless receiver to receive a plurality of measurement requests bundled together from a remote server, wherein the plurality of measurement requests are based on crowdsourcing queries from a plurality of parties;
- program code to measure contextual data in response to the plurality of measurement requests; and
- program code to cause a wireless transmitter to provide the contextual data to the remote server, wherein the contextual data comprises at least one of sensor data, data related to a physical description of behavior of a user of a mobile platform that receives the plurality of measurement requests, and data related to use of the mobile platform.

38. The non-transitory computer-readable medium of claim 37, wherein at least one of the plurality of measurement requests is specific to a location and includes a frequency and a number of samples to be measured.

* * * * *